United States Patent
Lienau et al.

(10) Patent No.: US 11,408,297 B2
(45) Date of Patent: Aug. 9, 2022

(54) AIR SEAL ASSEMBLY

(71) Applicant: Raytheon Technologies Corporation, Farmington, CT (US)

(72) Inventors: Jeffrey J. Lienau, Wethersfield, CT (US); Robert Newman, Harwinton, CT (US); Conway Chuong, Manchester, CT (US); Kristin Kopp-Vaughan, East Hartford, CT (US); Senthil Prasad Mathiyalagan, Puddukottai (IN); Krishna Nelanti, Nalgonda (IN); Rajendra Prasad Uppara Allabanda, East Hartford, CT (US)

(73) Assignee: Raytheon Technologies Corporation

( * ) Notice: Subject to any disclaimer, the term of this patent is extended or adjusted under 35 U.S.C. 154(b) by 0 days.

(21) Appl. No.: 17/146,903

(22) Filed: Jan. 12, 2021

(65) Prior Publication Data
US 2021/0231023 A1    Jul. 29, 2021

(30) Foreign Application Priority Data
Jan. 27, 2020  (IN) ............................. 202011003624

(51) Int. Cl.
 *F01D 11/00* (2006.01)
 *F01D 25/12* (2006.01)
 *F01D 25/14* (2006.01)
 *F02C 7/28* (2006.01)

(52) U.S. Cl.
 CPC ............ *F01D 11/005* (2013.01); *F01D 25/12* (2013.01); *F01D 25/14* (2013.01); *F02C 7/28* (2013.01); *F05D 2240/57* (2013.01); *F05D 2240/81* (2013.01); *F05D 2260/201* (2013.01)

(58) Field of Classification Search
 CPC .......... F01D 11/005; F01D 25/12; F02C 7/28; F05D 2240/57
 See application file for complete search history.

(56) References Cited

U.S. PATENT DOCUMENTS

| | | | | |
|---|---|---|---|---|
| 5,560,198 A | * | 10/1996 | Brewer | ..................... F02K 1/80 60/766 |
| 8,484,943 B2 | | 7/2013 | Cunha | |
| 9,316,153 B2 | | 4/2016 | Patat | |
| 9,347,330 B2 | * | 5/2016 | Chuong | ................ F01D 11/003 |
| 9,366,444 B2 | | 6/2016 | Salunkhe | |

(Continued)

OTHER PUBLICATIONS

EP search report for EP21153834.3 dated Jun. 11, 2021.

*Primary Examiner* — Eldon T Brockman
(74) *Attorney, Agent, or Firm* — Getz Balich LLC (57) ABSTRACT

An air seal assembly for a gas turbine includes a flow path platform. The air seal assembly further includes a casing disposed radially outside the flow path platform. The air seal assembly further includes an annular finger seal mounted to the casing and disposed between the flow path platform and the casing. The annular finger seal includes a first circumferential portion mounted to the casing, a second circumferential portion extending from the first circumferential portion, and a third circumferential portion extending from the second circumferential portion and contacting an outer surface of the flow path platform. The third circumferential portion includes a plurality of air cooling holes configured to direct a cooling air stream onto the flow path platform.

16 Claims, 8 Drawing Sheets

(56) References Cited

U.S. PATENT DOCUMENTS

| | | | |
|---|---|---|---|
| 9,562,478 B2 | 2/2017 | Chuong | |
| 9,670,791 B2 | 6/2017 | Broomer | |
| 9,879,556 B2 * | 1/2018 | Chuong | F01D 25/12 |
| 10,364,748 B2 * | 7/2019 | Teixeira | F02C 7/28 |
| 2013/0270777 A1 | 10/2013 | Clouse | |
| 2014/0183825 A1 * | 7/2014 | Chuong | F16J 15/0887 |
| | | | 277/411 |
| 2015/0354386 A1 * | 12/2015 | Chuong | F01D 25/30 |
| | | | 415/182.1 |
| 2017/0350265 A1 | 12/2017 | McLaughlin | |
| 2018/0051629 A1 * | 2/2018 | Teixeira | F01D 11/005 |

* cited by examiner

FIG. 7

AIR SEAL ASSEMBLY

This application claims priority to Indian Patent Appln. No. 202011003624 filed Jan. 27, 2020, which is hereby incorporated herein by reference in its entirety.

BACKGROUND

1. Technical Field

This disclosure relates generally to gas turbines, and more particularly to seal configurations for reducing main gas path flow ingestion into secondary, lower-temperature regions of the gas turbine.

2. Background Information

Conventionally, a gas turbine includes a compressor section which pressurizes an air stream. Fuel is added to the compressed air stream and the mixture is burned in a central combustor section. The combustion products expand through a turbine section where bladed rotors convert energy from the combustion products into mechanical energy for rotating one or more centrally mounted shafts. The shafts, in turn, drive compressor section as well as other components of the gas turbine, thus continuing the cycle.

Seals are required in many locations within gas turbines to regulate air flow to various portions of the engine. One function of air seals in gas turbines is to limit ingestion of heated "core" or "main" gas path airflow into secondary cavities and passages. Secondary airflow system components are often constructed to tolerate lower maximum temperatures than main gas path components. Excessive ingestion of main gas path airflow can result in undesirable heating of engine components, potentially reducing part lifetimes and/or resulting in expensive and time-consuming repairs. Accordingly, what is needed is a seal assembly addressing one or more of the above-noted concerns.

SUMMARY

It should be understood that any or all of the features or embodiments described herein can be used or combined in any combination with each and every other feature or embodiment described herein unless expressly noted otherwise.

According to an embodiment of the present disclosure, an air seal assembly for a gas turbine includes a flow path platform. The air seal assembly further includes a casing disposed radially outside the flow path platform. The air seal assembly further includes an annular finger seal mounted to the casing and disposed between the flow path platform and the casing. The annular finger seal includes a first circumferential portion mounted to the casing, a second circumferential portion extending from the first circumferential portion, and a third circumferential portion extending from the second circumferential portion and contacting an outer surface of the flow path platform. The third circumferential portion includes a plurality of air cooling holes configured to direct a cooling air stream onto the flow path platform.

In the alternative or additionally thereto, in the foregoing embodiment, the annular finger seal further includes a fillet disposed at an interface between the second circumferential portion and the third circumferential portion of the annular finger seal.

In the alternative or additionally thereto, in the foregoing embodiment, one or more of the fillet and the second circumferential portion contact a dogbone seal carrier disposed axially aft of the first circumferential portion.

In the alternative or additionally thereto, in the foregoing embodiment, the second circumferential portion extends between the casing and the dogbone seal carrier.

In the alternative or additionally thereto, in the foregoing embodiment, the plurality of air cooling holes is arranged in a circumferential row about the annular finger seal.

In the alternative or additionally thereto, in the foregoing embodiment, each air cooling hole of the plurality of air cooling holes is directed towards the outer surface of the flow path platform.

In the alternative or additionally thereto, in the foregoing embodiment, the third circumferential portion has a length extending between the fillet and a point of contact between the third circumferential portion and the outer surface of the flow path platform and the circumferential row of the plurality of air cooling holes is disposed in a middle section of the third circumferential portion.

In the alternative or additionally thereto, in the foregoing embodiment, the circumferential row of the plurality of air cooling holes is disposed in the third circumferential portion at a center of the length.

In the alternative or additionally thereto, in the foregoing embodiment, the plurality of air cooling holes is configured to direct air from a first side of the annular finger seal to a second side of the annular finger seal so as to impinge on the outer surface of the flow path platform.

In the alternative or additionally thereto, in the foregoing embodiment, the second circumferential portion of the annular finger seal is free of penetrations.

According to another embodiment of the present disclosure, a gas turbine includes a first turbine module including a flow path platform and a casing disposed radially outside the flow path platform. The gas turbine further includes a second turbine module mounted to the first turbine module and disposed axially aft of the first turbine module. The gas turbine further includes an annular finger seal mounted to the casing and disposed between the flow path platform and the casing. The annular finger seal includes a first circumferential portion mounted to the casing, a second circumferential portion extending from the first circumferential portion, and a third circumferential portion extending from the second circumferential portion and contacting an outer surface of the flow path platform. The third circumferential portion includes a plurality of air cooling holes configured to direct a cooling air stream onto the flow path platform.

In the alternative or additionally thereto, in the foregoing embodiment, the first turbine module includes a fairing assembly including a fairing outer platform defining the flow path platform and a fairing inner platform disposed radially inward of the fairing outer platform. The fairing outer platform and the fairing inner platform defining a portion of a main engine gas flow path therebetween.

In the alternative or additionally thereto, in the foregoing embodiment, the casing is a first casing and the second turbine module includes a second casing mounted to the first casing radially outside the annular finger seal.

In the alternative or additionally thereto, in the foregoing embodiment, the annular finger seal further includes a fillet disposed at an interface between the second circumferential portion and the third circumferential portion of the annular finger seal.

In the alternative or additionally thereto, in the foregoing embodiment, the second turbine module further includes a dogbone seal carrier mounted to the second casing and one or more of the fillet and the second circumferential portion contact the dogbone seal carrier.

In the alternative or additionally thereto, in the foregoing embodiment, the plurality of air cooling holes is arranged in a circumferential row about the annular finger seal and the second circumferential portion of the annular finger seal is free of penetrations.

According to another embodiment of the present disclosure a method for cooling an air seal assembly includes providing an annular finger seal mounted to a casing and disposed between a flow path platform and the casing. The casing is disposed radially outside the flow path platform. The annular finger seal includes a first circumferential portion mounted to the casing, a second circumferential portion extending from the first circumferential portion, and a third circumferential portion extending from the second circumferential portion and contacting an outer surface of the flow path platform. The method further includes directing a cooling air stream onto the flow path platform with a plurality of air cooling holes disposed in the third circumferential portion.

In the alternative or additionally thereto, in the foregoing embodiment, the plurality of air cooling holes is arranged in a circumferential row about the annular finger seal.

In the alternative or additionally thereto, in the foregoing embodiment, each air cooing hole of the plurality of air cooling holes is directed towards the outer surface of the flow path platform.

In the alternative or additionally thereto, in the foregoing embodiment, the second circumferential portion of the annular finger seal is free of penetrations.

The present disclosure, and all its aspects, embodiments and advantages associated therewith will become more readily apparent in view of the detailed description provided below, including the accompanying drawings.

DETAILED DESCRIPTION

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Figure 1A:
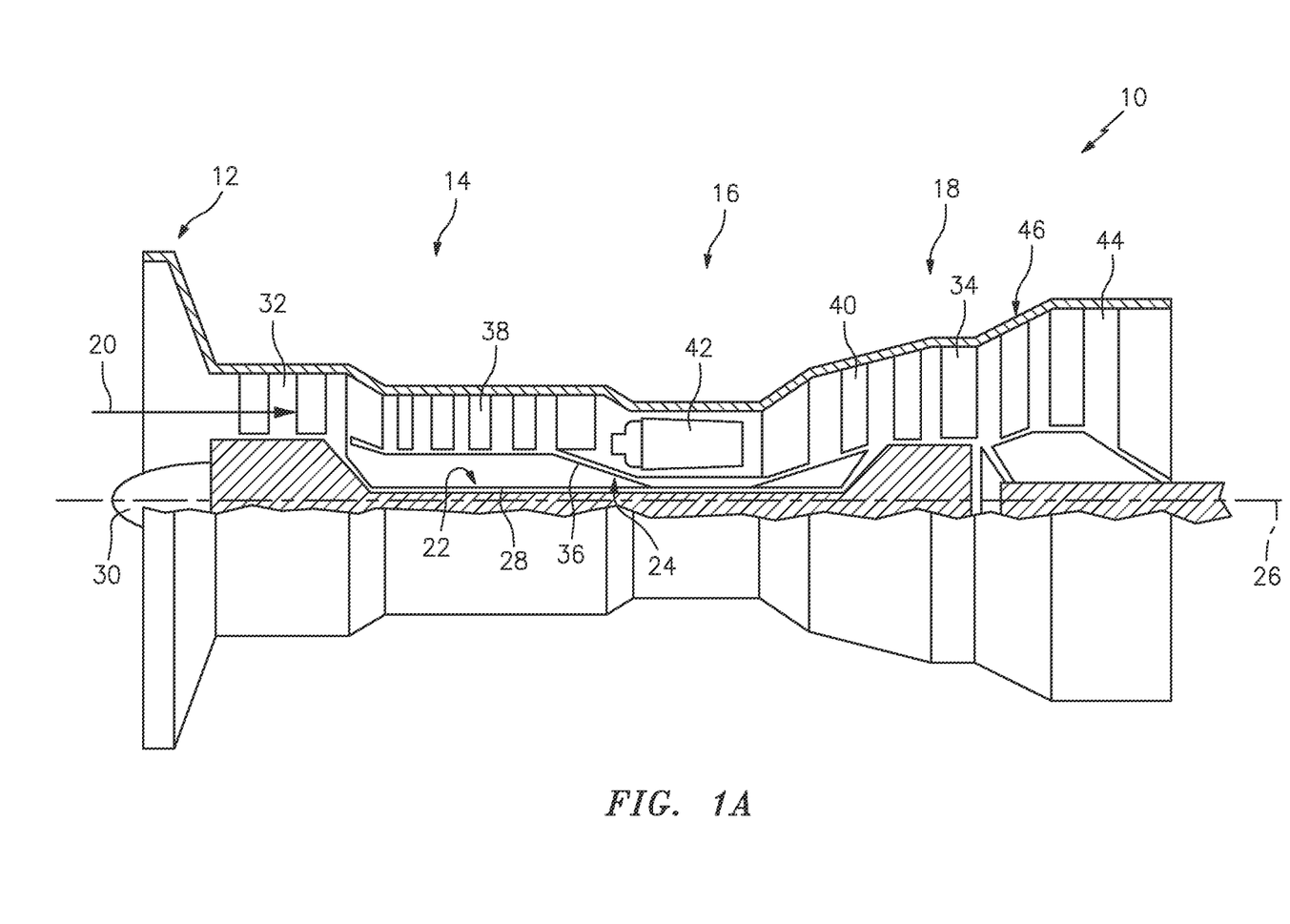
FIG. 1A illustrates a side cross-sectional view of a gas turbine engine in accordance with one or more embodiments of the present disclosure.
Figure 1B:
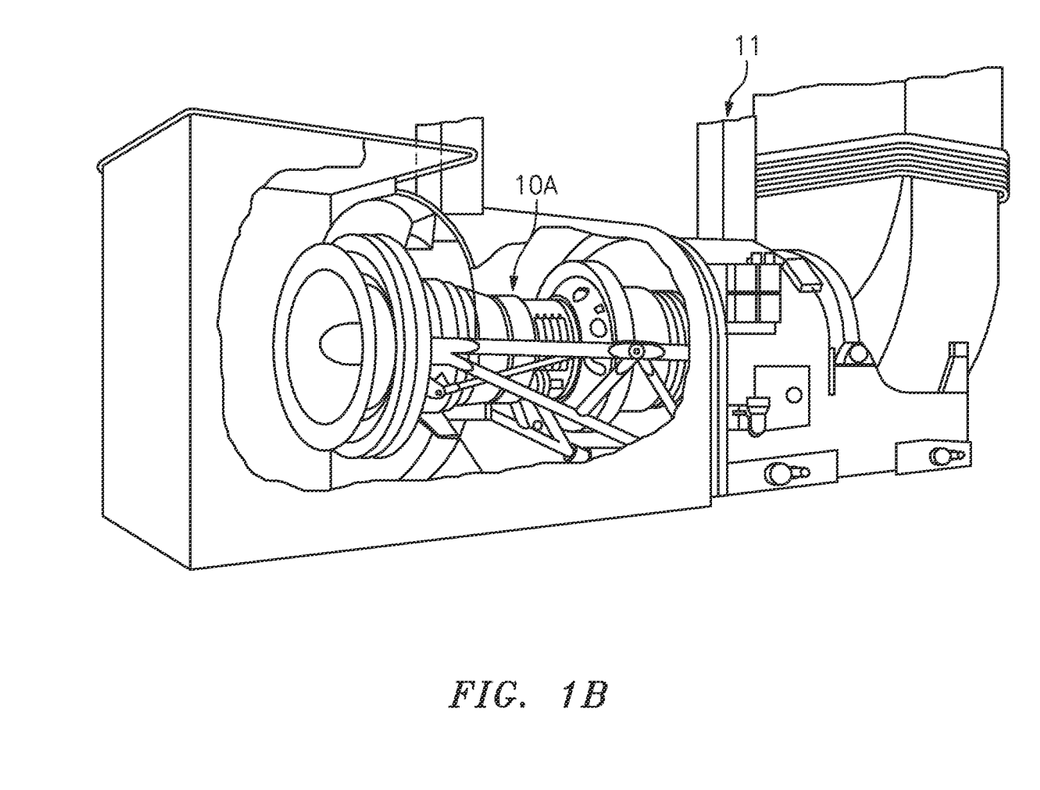
FIG. 1B illustrates a perspective cutaway view of a land-based industrial gas turbine in accordance with one or more embodiments of the present disclosure.

Referring to FIGS. 1A and 1B, an exemplary gas turbine engine 10 is schematically illustrated. The gas turbine engine 10 is disclosed herein as a two-spool turbofan engine that generally includes a fan section 12, a compressor section 14, a combustor section 16, and a turbine section 18. The fan section 12 followed by the compressor section 14 drives air along a core flowpath 20 for compression and communication into the combustor section 16 and then expansion through the turbine section 18. Although depicted as a turbofan gas turbine engine in the disclosed non-limiting embodiments, it should be understood that the concepts described herein are not limited to use with turbofans as the teachings may be applied to other types of turbines and/or turbine engines including those with three-spool architectures. Still other engine architectures 10A are located within an enclosure 11 (see FIG. 1B) typical of a land-based industrial gas turbine (IGT). The engine architecture 10A may include one or more sections 12, 14, 16, 18 similar to those discussed herein with respect to the gas turbine engine 10. Accordingly, while embodiments of the present disclosure may be explained with respect to gas turbine engines (e.g., the gas turbine engine 10), it should be understood that the embodiments of the present disclosure are not limited to gas turbine engines. The term "gas turbine" may be used herein to include any configuration of gas turbine including gas turbine engines, industrial gas turbines, etc.

The gas turbine engine 10 generally includes a low-pressure spool 22 and a high-pressure spool 24 mounted for rotation about a longitudinal centerline 26 of the gas turbine engine 10. The low-pressure spool 22 generally includes a first shaft 28 that interconnects a fan 30, a low-pressure compressor 32, and a low-pressure turbine 34. The first shaft 28 may be connected to the fan 30 through a gear assembly, such as a fan drive gear system to drive the fan 30 at a lower speed than the low-pressure spool 22. The high-pressure spool 24 generally includes a second shaft 36 that interconnects a high-pressure compressor 38 and a high-pressure turbine 40. It is to be understood that "low pressure" and "high pressure" or variations thereof as used herein are relative terms indicating that the high pressure is greater than the low pressure.

A combustor 42 is disposed between the high-pressure compressor 38 and the high-pressure turbine 40 along the longitudinal centerline 26. The first shaft 28 and the second shaft 36 are concentric and rotate via one or more bearing systems about the longitudinal centerline 26 which is collinear with respective longitudinal centerlines of the first and second shafts 28, 36.

Airflow along the core flowpath 20 is compressed by the low-pressure compressor 32, then the high-pressure compressor 38, mixed and burned with fuel in the combustor 42, and then expanded over the high-pressure turbine 40, the low-pressure turbine 34, and a power turbine 44. The low-pressure turbine 34 and the high-pressure turbine 40 rotationally drive the low-pressure spool 22 and the high-pressure spool 24, respectively, in response to the expansion. Power turbine 44 may, for example, drive an electrical generator, pump, gearbox, or other accessory (not shown). In the illustrated embodiment, the turbine section 18 meets the power turbine 44 at joint 46.

Figure 2:
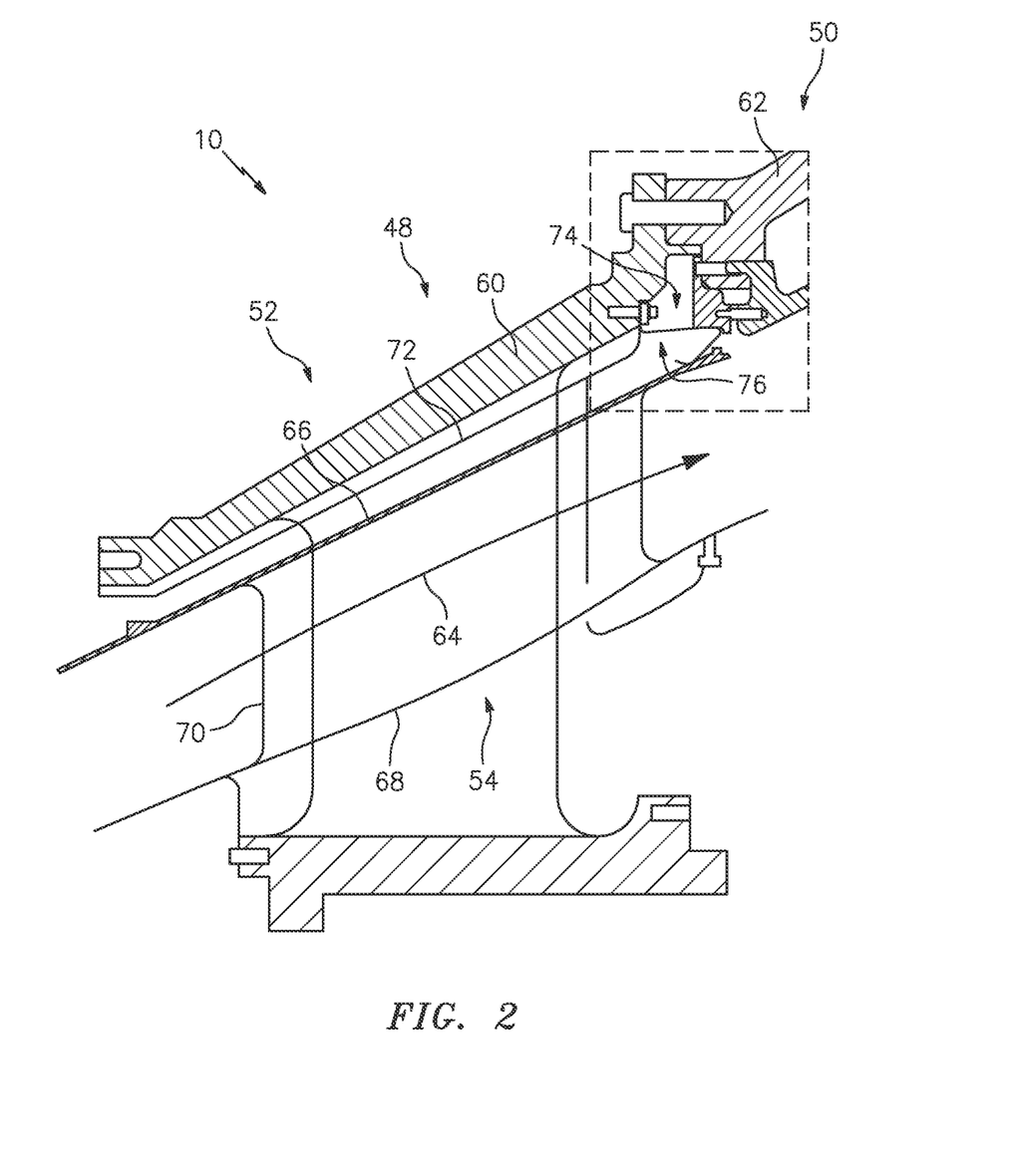
FIG. 2 illustrates a cross-sectional view of a turbine exhaust case region of the gas turbine engine of FIG. 1 in accordance with one or more embodiments of the present disclosure.

Referring to FIG. 2, a portion of the gas turbine engine 10 is illustrated near joint 46. The gas turbine engine 10 includes a first turbine module 48 and a second turbine module 50. In various embodiments, the first turbine module 48 may be a stage or region of the turbine section 18 while the second module 50 may be a stage or region of the power turbine 44. In various other embodiments, the first and second turbine modules 48, 50 may be other adjacent stages or regions of the gas turbine engine 10. For example, the first turbine module 48 may be a turbine exhaust case (TEC) assembly connecting the low-pressure turbine 34 to the power turbine 44. In various embodiments, the first turbine module 48 and the second turbine module 50 may have adjacent stationary vane sections, while in other various embodiments the first turbine module 48 and the second turbine module 50 may include adjacent stationary and rotating components. Although the first turbine module 48 and the second turbine module 50 are referred to hereinafter as a TEC and power turbine, respectively, it should be appreciated that the first turbine module 48 can be any suitable module or portion of the gas turbine engine 10 such as a module of the compressor or turbine sections 14, 18. Similarly, the second turbine module 50 may be any module or portion of the gas turbine engine 10 secured axially aft of the first turbine module 48. Gas turbine engines may be divided into modules, such as the first and second turbine modules 48, 50, for ease of assembly and design.

The first turbine module 48 includes a frame 52 and a fairing assembly 54. The second turbine module 50 may include at least one stator vane and at least one rotor blade (not shown). The first turbine module 48 may be connected to the second turbine module 50 such that the first and second turbine modules 48, 50 abut along respective first and second casings 60, 62 and the at least one stator vane and the at least one rotor blade are disposed downstream of the frame 52 and fairing assembly 54 with respect to a main engine gas flow path 64 which may be all or a portion of the core flow path 20.

The fairing assembly 54 includes a fairing outer platform 66 and a fairing inner platform 68 spaced from the fairing outer platform 66 by strut liners 70. The fairing outer platform 66, the fairing inner platform 68, and the strut liners 70 may be formed of, for example, sheets of high-temperature resistant materials such as nickel- or cobalt-based superalloys and, in various embodiments, may be formed from multiple circumferential segments or sections welded together. The fairing outer platform 66 and the fairing inner platform 68 may function as flow path platforms for the main engine gas flow path 64 therebetween as well as one or more additional fluid flow paths external to the fairing assembly 54. The fairing assembly 54 prevents direct contact between the gases of the main engine gas flow path 64 with the frame 52. However, to provide further thermal insulation of the frame 52, the first turbine module 48 may include one or more heat shield elements 72 disposed, for example, between the frame 52 and the fairing outer platform 66.

Annular cavities disposed in the first and second turbine modules 48, 50, for example, annular cavity 74 disposed at an outer diameter (OD) location proximate the joint 46 between the first and second turbine modules 48, 50, may be sealed against ingestion of heated gases from the main engine gas flow path 64. Air seal assembly 76 is disposed proximate the annular cavity 74 to limit or eliminate the ingestion of heated gases from the main engine gas flow path 64 into the annular cavity 74.

Figure 3:
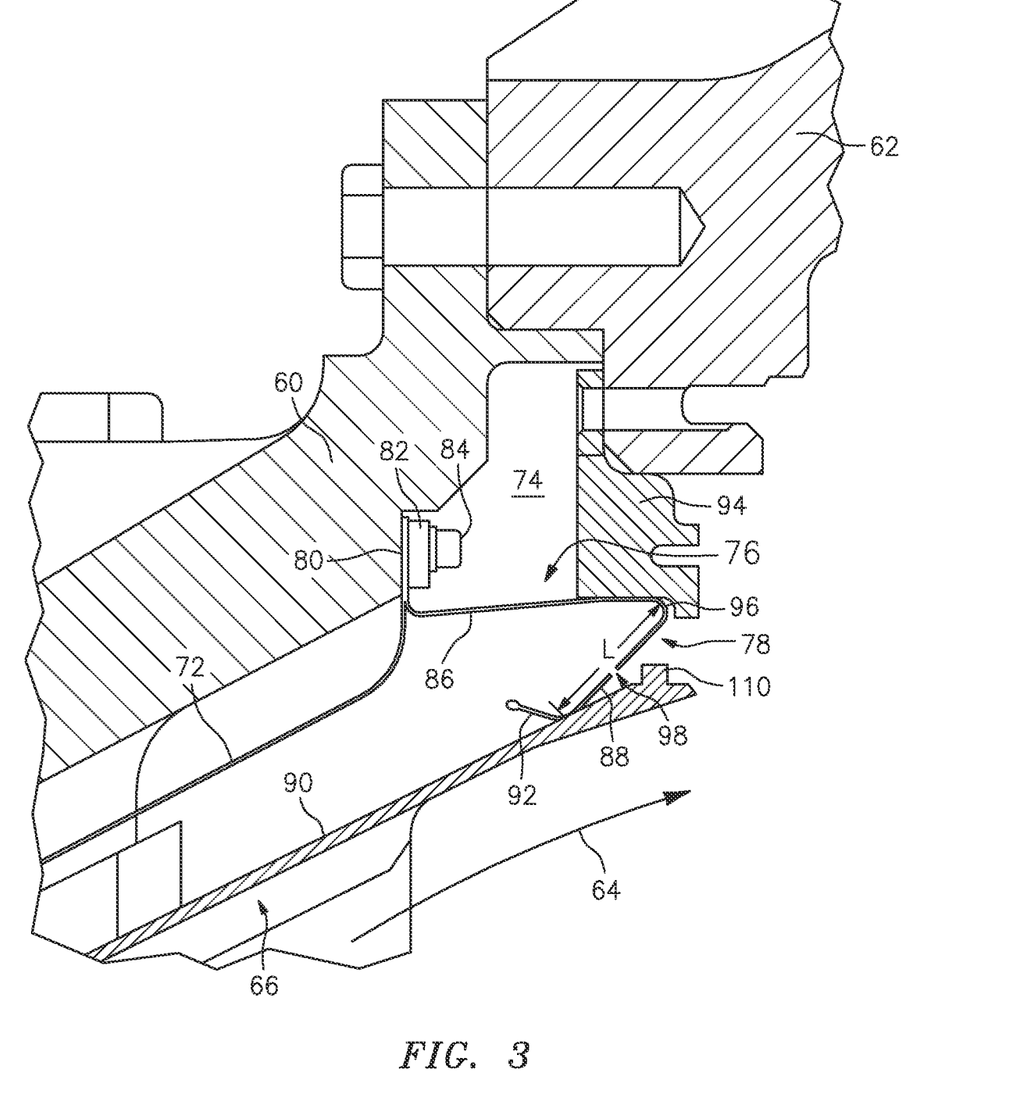
FIG. 3 illustrates a close-up, cross-sectional view of an air seal assembly of the turbine exhaust case region of FIG. 2 in accordance with one or more embodiments of the present disclosure.

Referring to FIG. 3, the air seal assembly 76 includes an annular finger seal 78 mounted to the first casing 60 and disposed between the fairing outer platform 66 and the first casing 60. The annular finger seal 78 includes a first circumferential portion 80 mounted to the first casing 60 by an annular retaining ring 82 and a plurality of bolts 84 which extending through a corresponding plurality of mounting holes 122 in the first circumferential portion 80. In various embodiments, the first circumferential portion 80 may be mounted with the heat shield element 72 between the first casing 60 and the annular retaining ring 82. The first circumferential portion 80 may extend generally radially between the first casing 60 and the annular retaining ring 82. The annular finger seal 78 further includes a second circumferential portion 86 extending from the first circumferential portion 80 in a generally axial direction. The second circumferential portion 86 may define an inner radial boundary of the annular cavity 74. The annular finger seal 78 further includes a third circumferential portion 88 extending from the second circumferential portion 86 and contacting a radially outer surface 90 of the fairing outer platform 66. The third circumferential portion 88 may generally extend in a radially inward and axially forward direction from the second circumferential portion 86 to a point of contact with the radially outer surface 90 of the fairing outer platform 66. The annular finger seal 78 may include a fourth circumferential portion 92 extending from the third circumferential portion in a direction away from the radially outer surface 90 of the fairing outer platform 66. Each of the first circumferential portion 80, the second circumferential portion 86, the third circumferential portion 88, and the fourth circumferential portion 92 may annularly extend about the circumference of the annular finger seal 78.

In various embodiments, the second turbine module 50 may include a dogbone seal carrier 94 mounted to the second casing 62 and disposed axially aft of the first circumferential portion 80 of the annular finger seal 78. The dogbone seal carrier 94 may define a portion of the annular cavity 74. The annular finger seal 78 may include a fillet 96 disposed at an interface between the second circumferential portion 86 and the third circumferential portion 88 of the annular finger seal 78. The second circumferential portion 86 of the annular finger seal 78 may extend between the first circumferential portion 80 and the dogbone seal carrier 94. The fillet 96 and/or a portion of the second circumferential portion 86 may contact a surface (e.g., an inner radial surface) of the dogbone seal carrier 94 forming a seal therebetween.

Referring to FIGS. 3-7, the third circumferential portion 88 of the annular finger seal 78 includes a plurality of air cooling holes 98 configured to direct a cooling air stream 100 onto the radially outer surface 90 of the fairing outer platform 66. The plurality of air cooling holes 98 extend through the third circumferential portion 88 between a first side 102 of the annular finger seal 78 and a second side of the annular finger seal 78. Accordingly, the plurality of air cooling holes 98 may be configured to direct air passing between the first casing 60 and the fairing outer platform 66 on a first side 102 of the annular finger seal to the second side 104 of the annular finger seal 78 so as to impinge on the radially outer surface 90 of the fairing outer platform 68. In various embodiments, the plurality of air cooling holes 98 may be arranged in a single circumferential row about the annular finger seal 78 (see, e.g., FIG. 5). In this embodiment, the minimal number of holes presented by the single circumferential row may provide improved structural integrity of the annular finger seal 78. In various other embodiments, the plurality of air cooling holes 98 may be arranged, for example, in multiple circumferential rows adjacent one another within the third circumferential portion 88 of the annular finger seal 78 or in any other suitable arrangement. In various embodiments, one or more air cooling holes of the plurality of air cooling holes 98 may be disposed on each finger of a plurality of fingers 99 of the annular finger seal 78 (see, e.g., FIG. 5). In various other embodiments, one or more air cooling holes of the plurality of air cooling holes 98 may be disposed on less than each finger of the plurality of fingers 99 of the annular finger seal 78 (e.g., some fingers of the plurality of fingers 99 may not include any air cooling holes of the plurality of air cooling holes 98).

Figure 4:
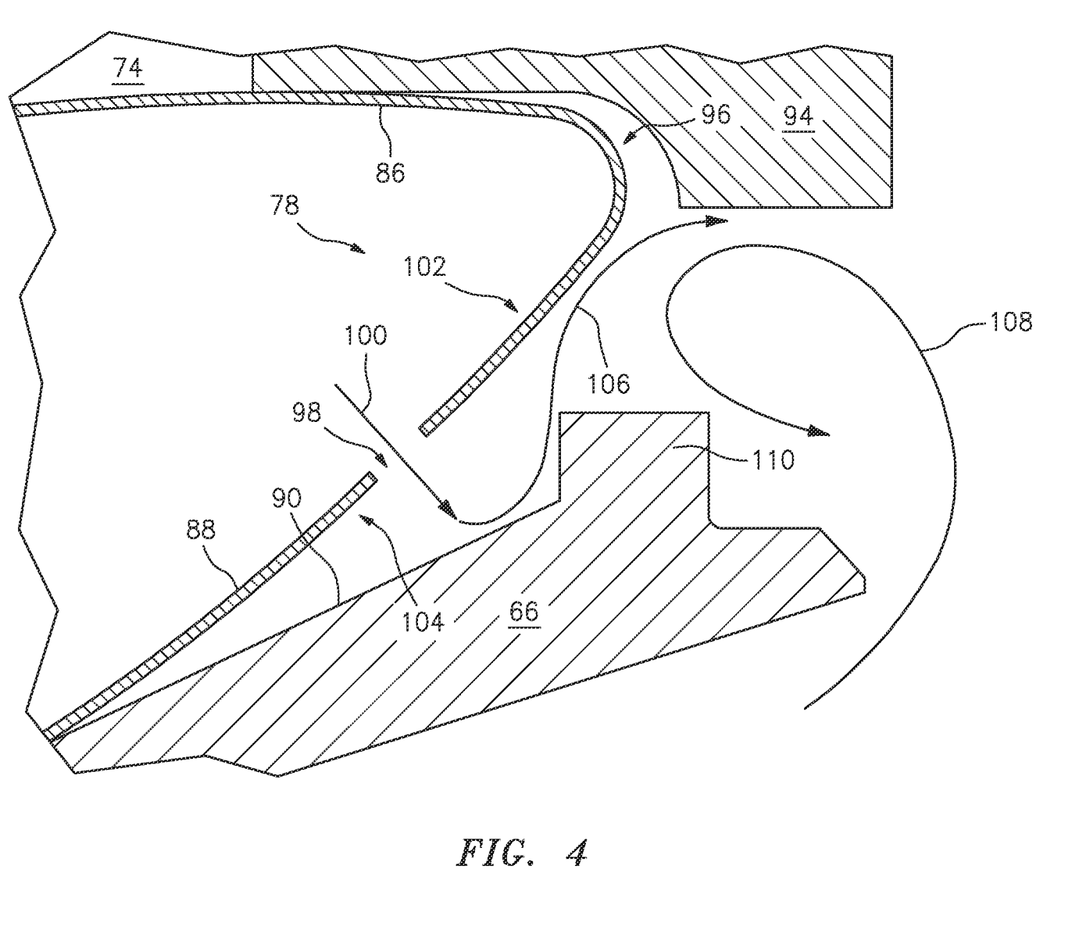
FIG. 4 illustrates a close-up, cross-sectional view of the air seal assembly of FIG. 3 in accordance with one or more embodiments of the present disclosure.
Figure 5:
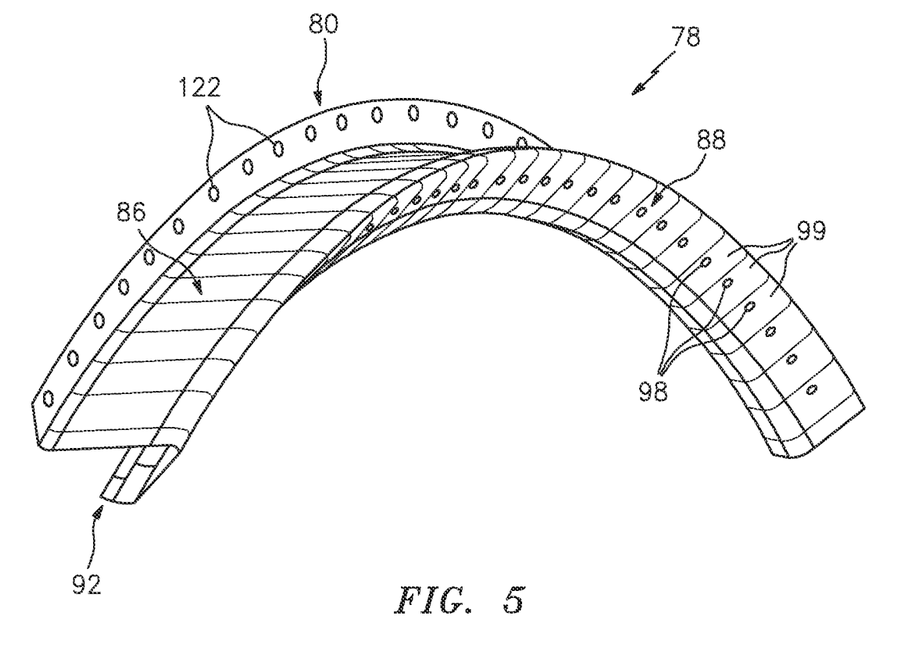
FIG. 5 illustrates a perspective view of a portion of an annular finger seal of the air seal assembly of FIG. 3 in accordance with one or more embodiments of the present disclosure.

The third circumferential portion 88 has length L extending between the fillet 96 and the point of contact between the third circumferential portion 88 and the radially outer surface 90 of the fairing outer platform 66. In various embodiments, the plurality of air cooling holes 98 may be disposed in a middle section 106 of the third circumferential portion 88 with respect to the length L, wherein the middle section 106 is defined as a middle section of the third circumferential portion 88 along the length L corresponding to fifty percent of the length L. In various embodiments, the plurality of air cooling holes 98 may be disposed in the third circumferential portion 88 at a center 108 of the length L. For example, a circumferential row of the plurality of air cooling holes 98 may be disposed such that each air cooling hole of the plurality of air cooling holes 98 is disposed at the center 108 of the length L in the third circumferential portion 88.

In various embodiments, the second circumferential portion 86 of the annular finger seal 78 is free of penetrations (e.g., air cooling holes) extending, for example, from the first side 102 of the annular finger seal 78 to the annular cavity 74. Accordingly, the annular finger seal 78 may substantially seal the annular cavity 74, for example, from the ingestion of the heated gases of the main engine gas flow path 64. The absence of penetrations in the second circumferential portion 86 of the annular finger seal 78 may result in an increased volumetric flow rate of cooling air directed through the plurality of cooling holes 98 in the third circumferential portion 88 in comparison to a hypothetical finger seal having air cooling holes in the second circumferential portion. The absence of penetrations in the second circumferential portion 86 of the annular finger seal 78 may additionally result in greater structural integrity and resiliency of the second circumferential portion 86.

As shown in FIG. 4, cooling air directed along the cooling air stream 100 by the plurality of cooling air holes 98 may impinge upon the outer radial surface 90 of the fairing outer platform 66 and subsequently flow downstream between the fairing outer platform 66 and the annular finger seal 78 forming an air dam 106. For example, the air dam 106 may be formed as a result of cooling air flowing in a direction substantially similar to the air dam 106 as illustrated in FIG. 4. The formation of the air dam 106 between the annular finger seal 78 and the main engine gas flow path 64 may reduce or prevent ingestion of heated gases 108 from the main engine gas flow path 64 which may interact with and degrade, for example, the annular finger seal 78 or structural components of the first and second turbine modules 48, 50 proximate the annular cavity 74. The reduction of the ingestion may be, for example, a result of the impingement of the cooling air stream 100 from the plurality of cooling air holes 98 creating an aerodynamic blockage feature (e.g., the air dam 106) followed by the tendency of that cooling air to then purge the annular region downstream of the annular finger seal 78 (e.g., between the fairing outer platform 66 and the dogbone seal carrier 94). Further, the purging effect is emphasized by the dynamic pressure of the high-velocity cooling air stream 100 impinging onto the fairing outer platform 66 and being converted to slightly higher static pressure. In various embodiments, the fairing outer platform 66 may include one or more projections 110 or other structural features disposed downstream from the annular finger seal 78 and configured to further direct the cooling air of the air dam 106 along a desired flow path. For example, the fairing outer platform may include an annular projection 110 projecting radially from the radially outer surface 90 of the fairing outer platform 66 toward the dogbone seal carrier 94.

Figure 6:
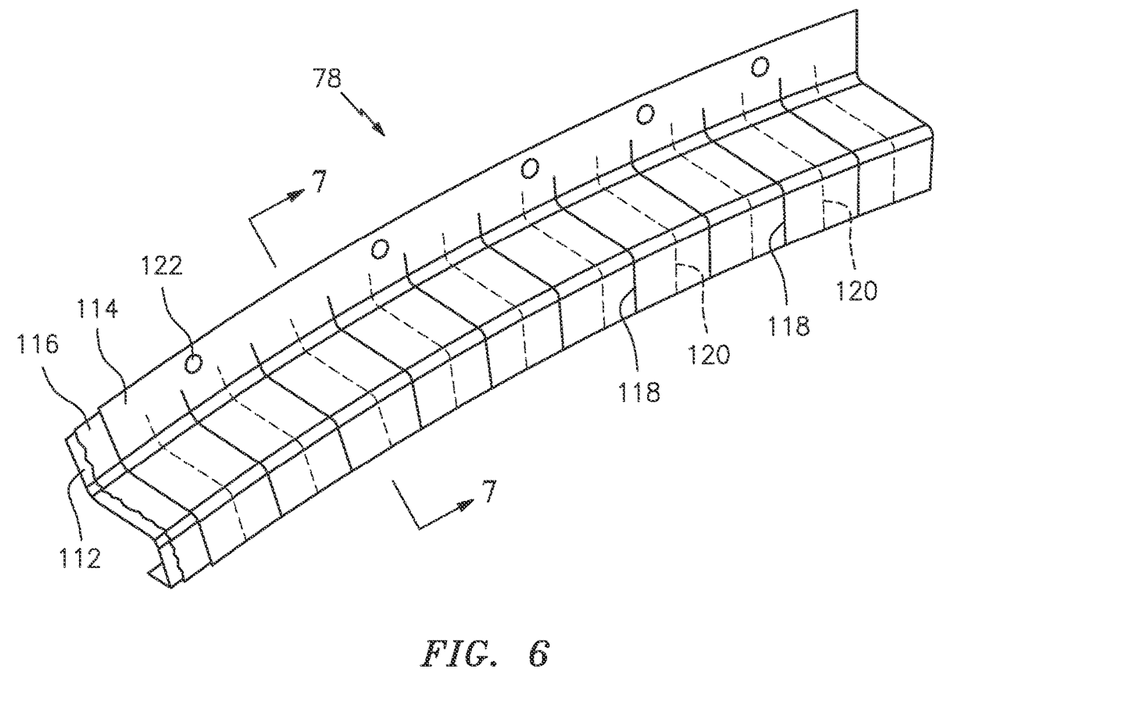
FIG. 6 illustrates a perspective cutaway view of a portion of an annular finger seal of the air seal assembly of FIG. 3 in accordance with one or more embodiments of the present disclosure.
Figure 7:
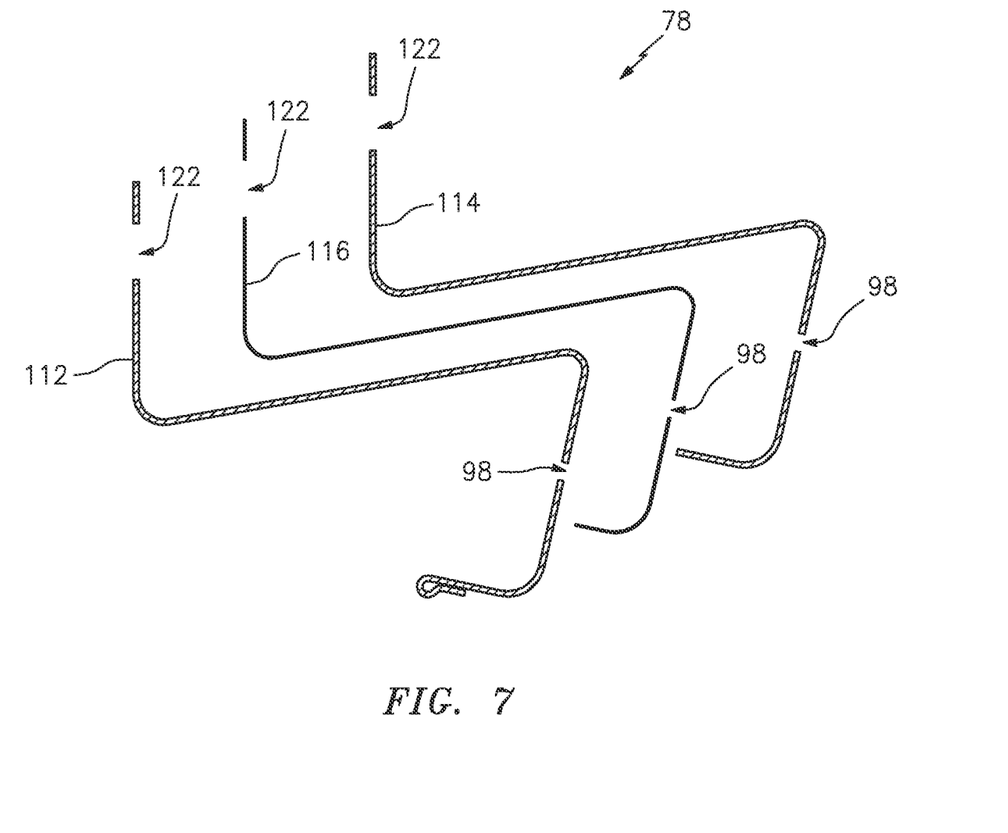
FIG. 7 illustrates an exploded cross-sectional view of the annular finger seal of FIG. 6 taken along line 7-7 in accordance with one or more embodiments of the present disclosure.

As shown in FIGS. 6 and 7, the annular finger seal 78 may include first and second plies 112, 114, and a foil layer 116. The first ply 112 and the second ply 114 may, for example, each be folded sheet metal components. In various embodiments, the first ply 112 and the second ply 114 may each be formed entirely from multi-segmented sheets of stamped and/or folded metal. In various embodiments, the first ply 112 and the second ply 114 may be formed of a plurality of connected pieces.

The first ply 112 and the second ply 114 may each be disposed with a respective plurality of keyhole slots 118, 120. The keyhole slots 118, 120 may extend through each of the circumferential portions 80, 86, 88, 92 of each ply 112, 114 and may be elongated slots or slits with widened (e.g., "lollipop") ends to provide stress relief. The keyhole slots 118 may be circumferentially offset from the keyhole slots 120 to reduce air flow through the annular finger seal 78. The foil layer 116 is a flexible or deformable foil sheet located between the first and second plies 112, 114 to further reduce unwanted air flow through the annular finger seal 78, such that substantially the only air flow through the annular finger seal 78 is through the plurality of cooling air holes 98. The plurality of air cooling holes 98 have been omitted in FIG. 6 to more clearly illustrate the keyhole slots 118, 120 of the respective first and second plies 112, 114.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. An air seal assembly for a gas turbine, the air seal assembly comprising:
   a flow path platform;
   a casing disposed radially outside the flow path platform; and
   an annular finger seal mounted to the casing and disposed between the flow path platform and the casing, the annular finger seal comprising a first circumferential portion mounted to the casing, a second circumferential portion extending from the first circumferential portion, and a third circumferential portion extending from the second circumferential portion and contacting an outer surface of the flow path platform, the third circumferential portion comprising a plurality of air cooling holes configured to direct a cooling air stream onto the flow path platform;
   wherein the annular finger seal further comprises a fillet disposed at an interface between the second circumferential portion and the third circumferential portion of the annular finger seal; and
   wherein one or both of the fillet and the second circumferential portion contact a seal carrier disposed axially aft of the first circumferential portion.

2. The air seal assembly of claim 1, wherein the second circumferential portion extends between the casing and the seal carrier.

3. The air seal assembly of claim 1, wherein the plurality of air cooling holes is arranged in a circumferential row about the annular finger seal.

4. The air seal assembly of claim 3, wherein each air cooling hole of the plurality of air cooling holes is directed towards the outer surface of the flow path platform.

5. The air seal assembly of claim 4, wherein the third circumferential portion has a length extending between the fillet and a point of contact between the third circumferential portion and the outer surface of the flow path platform and wherein the circumferential row of the plurality of air cooling holes is disposed in a middle section of the third circumferential portion.

6. The air seal assembly of claim 5, wherein the circumferential row of the plurality of air cooling holes is disposed in the third circumferential portion at a center of the length.

7. The air seal assembly of claim 4, wherein the plurality of air cooling holes is configured to direct air from a first side of the annular finger seal to a second side of the annular finger seal so as to impinge on the outer surface of the flow path platform.

8. The air seal assembly of claim 4, wherein the second circumferential portion of the annular finger seal is free of penetrations.

9. A gas turbine comprising:
   a first turbine module comprising a flow path platform and a casing disposed radially outside the flow path platform;
   a second turbine module mounted to the first turbine module and disposed axially aft of the first turbine module; and
   an annular finger seal mounted to the casing and disposed between the flow path platform and the casing, the annular finger seal comprising a first circumferential portion mounted to the casing, a second circumferential portion extending from the first circumferential portion, and a third circumferential portion extending from the second circumferential portion and contacting an outer surface of the flow path platform, the third circumferential portion comprising a plurality of air cooling holes configured to direct a cooling air stream onto the flow path platform;
   wherein the annular finger seal further comprises a fillet disposed at an interface between the second circumferential portion and the third circumferential portion of the annular finger seal; and
   wherein the second turbine module further comprises a seal carrier mounted to the second casing and wherein one or both of the fillet and the second circumferential portion contact the seal carrier.

10. The gas turbine of claim 9, wherein the first turbine module comprises a fairing assembly comprising a fairing outer platform defining the flow path platform and a fairing inner platform disposed radially inward of the fairing outer platform, the fairing outer platform and the fairing inner platform defining a portion of a main engine gas flow path therebetween.

11. The gas turbine of claim 10, wherein the casing is a first casing and wherein the second turbine module comprises a second casing mounted to the first casing radially outside the annular finger seal.

12. The gas turbine of claim 9, wherein the plurality of air cooling holes is arranged in a circumferential row about the annular finger seal and wherein the second circumferential portion of the annular finger seal is free of penetrations.

13. A method for cooling an air seal assembly, the method comprising:
   providing an annular finger seal mounted to a casing and disposed between a flow path platform and the casing, the casing disposed radially outside the flow path platform, the annular finger seal comprising a first circumferential portion mounted to the casing, a second circumferential portion extending from the first circumferential portion, and a third circumferential portion extending from the second circumferential portion and contacting an outer surface of the flow path platform; and
   directing a cooling air stream onto the flow path platform with a plurality of air cooling holes disposed in the third circumferential portion;
   wherein the annular finger seal further comprises a fillet disposed at an interface between the second circumferential portion and the third circumferential portion of the annular finger seal; and
   wherein one or both of the fillet and the second circumferential portion contact a seal carrier disposed axially aft of the first circumferential portion.

14. The method of claim 13, wherein the plurality of air cooling holes is arranged in a circumferential row about the annular finger seal.

15. The method of claim 14, wherein each air cooling hole of the plurality of air cooling holes is directed towards the outer surface of the flow path platform.

16. The method of claim 15, wherein the second circumferential portion of the annular finger seal is free of penetrations.

\* \* \* \* \*